EFFECT OF INCREASING $Zn^{++}$ CONTENT IN PRESENCE OF DIPHENYL DECYL PHOSPHITE (dpdp)

EFFECT OF PHENYL DIDECYL PHOSPHITE (pddp) COMPARED WITH DIPHENYL DECYL PHOSPHITE (dpdp)

_United States Patent Office_

3,575,905
Patented Apr. 20, 1971

3,575,905
HEAT STABILIZERS FOR POLYVINYL CHLORIDE AND SIMILAR POLYMERS
Philip H. Rhodes, Cincinnati, Ohio, assignor to Emery Industries, Inc., Cincinnati, Ohio
Filed Feb. 1, 1968, Ser. No. 702,408
Int. Cl. C08f 45/58, 45/02
U.S. Cl. 260—23
7 Claims

ABSTRACT OF THE DISCLOSURE

Polymers and copolymers of vinyl chloride can be thermally stabilized by adding an aryl alkyl phosphite together with a zinc salt in an amount corresponding to between 0.0005 and 0.005 part of divalent zinc. In these amounts, zinc effectively retards thermal discoloration without causing sudden degradation. The stabilized polymer compositions may also contain other conventional plastics additives.

BACKGROUND OF THE INVENTION

This invention relates to the heat stabilization of halogen-containing thermoplastic resins, and more particularly to the heat stabilization of polymers and copolymers to vinyl chloride.

The thermal instability of polyvinyl chloride and other halogenated thermoplastic resin compounds is well known. Thermal decomposition is evidenced by more or less rapid discoloration at the elevated temperatures required during various processing and fabricating operations such as compounding, molding, extruding, calendering, and the like.

Many substances have been proposed as stabilizers to prevent or retard thermal decomposition of these resins. Most commonly used are stabilizers based on barium-cadmium salts, usually in combination with various other substances such as, for example, organic phosphites, hindered phenols, and epoxy compounds. An important objection to these stabilizers is their susceptibility to "sulfur staining," i.e., sulfur compounds, present in the atmosphere or in adjacent materials such as vulcanized rubber, combined with cadimum to form a colored sulfide which adversely affects the appearance of the plastic. Moreover, these stabilizers frequently contribute to other common faults such as plate-out and over-lubrication.

Very early references suggest the use of zinc salts as stabilizers for halogen-containing resins. However, it is also well known that zinc causes suddent degradation of the resin; i.e., the resin exhibits little or no discoloration for a period of time but then very suddenly blackens and chars. For example, Ackermann noted in U.S. Pat. 3,262,-896: "Unfortunately, zinc stabilizers have a very annoying property of their own; already in small amounts, they will blacken and char the resin to be stabilized in a very short time." A more detailed theoretical discussion can be found in the book "The Stabilization of Polyvinyl Chloride" by F. Chevassus and R. de Broutelles (St. Martin's Press, New York, 1963).

To overcome this deficiency of zinc the addition of alkaline earth or alkali metal salts has been proposed, but I have found that if zinc is present in the amounts previously recommended and used (customarily 0.1 part or more of zinc per 100 parts of resin), sudden degradation invariably occurs. Furthermore, I have found that even the addition of substantial amounts of alkaline earth or alkali metal salts, such as salts of calcium, barium or potassium, or other conventional plastics additives, such as organic phosphites, hindered phenols, epoxidized oils and the like, will not prevent sudden degradation.

While organic phosphites are also well known additives for vinyl halide resins, alone they are not effective heat stabilizers. In combination with certain metal salts, however, they prolong heat stability in some manner not fully understood. As previously noted, the addition of organic phosphites will not prevent the rapid degradation caused by zinc. Because of these faults, the commercial use of zinc as a heat stabilizer for plastics containing vinyl chloride has been limited to special applications where the toxicity of barium-cadmium salts cannot be tolerated.

As used herein, the term "sudden degradation" indicates that the resin composition has turned from nearly colorless to dark brown or black within a period of 5 minutes or less. Sudden degradation is considered to have been effectively prevented if it does not occur within the time normally required to process and fabricate the finished plastic article. This time may vary from a few minutes to as much as half an hour or more depending upon the particular product to be manufactured and other factors.

SUMMARY OF THE INVENTION

Among the objects of the present invention may be mentioned the provision of heat-stabilized halogenated resins, which are substantially free from cadmium or other metal salts forming colored sulfides and which are not subject to the sudden degradation characteristic of conventional zinc-stabilized resins. Other objects and features will be in part apparent and in part pointed out hereinafter.

The present invention is directed to heat-stabilized thermoplastic compositions comprising: (a) a polymeric resin containing a substantial proportion of a homopolymer or copolymer of vinyl halide; (b) an aryl alkyl phosphite in an amount from about 0.5 to about 5 parts per 100 parts of resin; (c) a zinc salt, soluble in said phosphite, equivalent to an amount from 0.0005 to not more than about 0.005 part divalent zinc per 100 parts of resin; the said thermoplastic composition being further characterized by its substantial freedom from metals which form colored sulfides.

It has been found that these small amounts of zinc, when combined with an aryl alkyl phosphite, are surprisingly effective in retarding thermal discoloration of plasticized polyvinyl chloride and similar halogenated resins. If, however, zinc is present in concentrations higher than about 0.005 part of divalent zinc per hundred parts of resin, rapid degradation invariably results and is not prevented by any known auxiliary additives.

Following the disclosures of this invention resin compositions can be prepared which remain essentially colorless for 40 minutes or longer at 380° F. without thereafter exhibiting sudden degradation as defined herein. Also, resin compositions can be prepared which do not become dark brown or black within 80 minutes at 380° F. Thus, the invention provides resin compositions which are free from the faults heretofore associated with zinc-stabilized compositions and which are stable and useful for a wide range of commercial applications.

DESCRIPTION OF THE PREFERRED EMBODIMENTS

Figure 1:
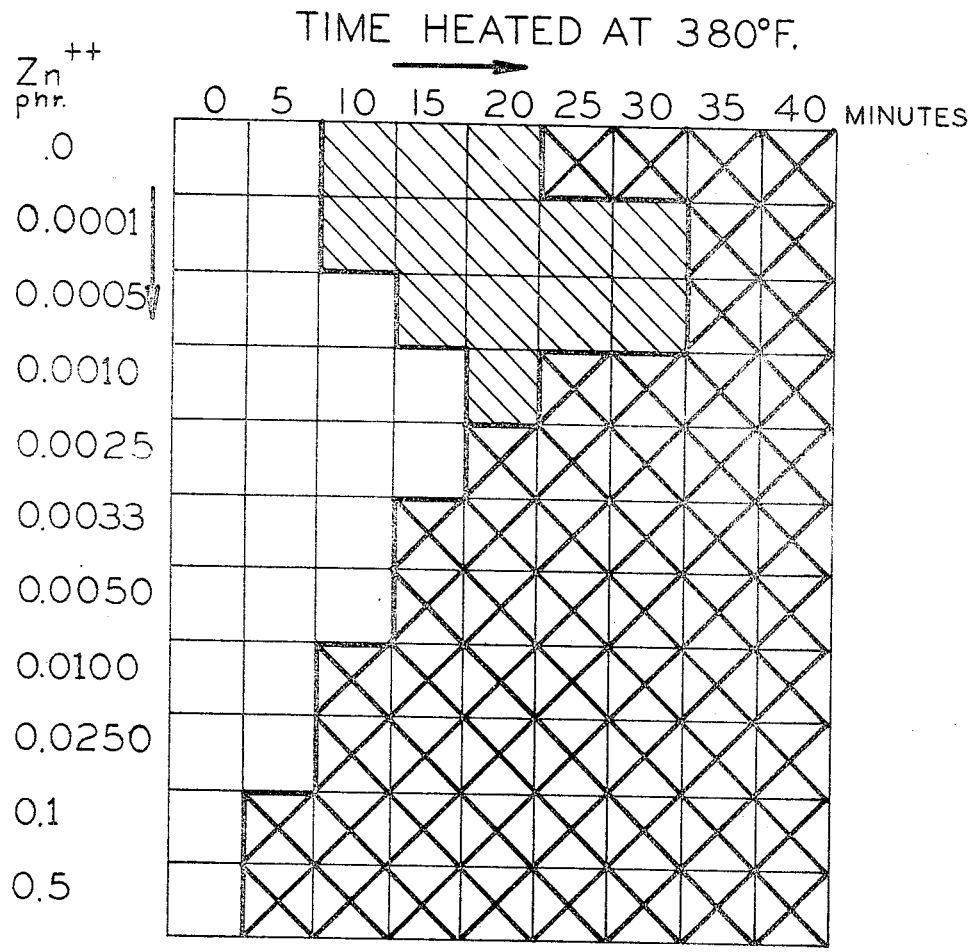
FIGS. 1–3 show graphically the results of tests carried out to determine the heat stabilizing effect of compositions of the invention.

The preferred zinc salts are those which are soluble in the aryl alkyl phosphite. Such salts permit the preparation of a simple liquid stabilizer that is readily blended and compounded with the resin and other usual components such as plasticizers, fillers, pigments, lubricants and the like employing conventional means. Zinc neodecanoate is a particularly useful salt because of its exceptional solubility in the phosphite. However I have found that in the small amounts required by the invention the anionic portion of the zinc salt has no appreciable effect on heat stability and so it may be selected solely on the bases of availability, economy, and convenience. Many organic and inorganic salts are therefore useful such as, for example, zinc chloride, zinc sulfate, as well as zinc soaps such as zinc stearate and zinc octoate.

The aryl alkyl phosphite may be either a diaryl monoalkyl phosphite or a monoaryl dialkyl phosphite. Examples of suitable phosphites are: diphenyl decyl phosphite, phenyl didecyl phosphite, diphenyl 2-ethylhexyl phosphite, phenyl di-(2-ethylhexyl) phosphite, isoctyl di-(p-tertiary octylphenyl) phosphite.

The aryl alkyl phosphite may be present in amounts varying from 0.5 to as much as 5 parts per 100 parts of resin. I have found that the proportion of phosphite is much less critical than the proportion of the zinc salt employed as a stabilizer.

The stabilizing effect of the zinc-phosphite combination can be further enhanced and extended by adding an epoxy compound to the resin composition. For this purpose epoxidized vegetable oils, for example, epoxidized soya oil, are particularly economical and useful sources of epoxy groups. For example, a portion of the plasticizer can be replaced with epoxidized soya oil, in which case the latter serves the dual function of a plasticizer and stabilizing additive. When such an epoxy compound is included in the resin composition, not only is thermal discoloration significantly retarded but the concentration of zinc which can be used without causing sudden degradation is somewhat increased. Although an epoxy compound is not essential to practicing the invention, such compounds significantly increase the effectiveness of the zinc-phosphite combination and extend the range of useful resin compositions which can be prepared in accordance with the invention.

It is also advantageous to prepare liquid stabilizer compositions in which the aryl alkyl phosphite serves as a solvent for the zinc salt and other additives. Such liquid stabilizers can be readily mixed with the dry resins and thereafter compounded by conventional means to form the desired homogeneous thermoplastic material. The proportions of alkyl aryl phosphite and zinc salt are adjusted so that the addition of the appropriate amount of the liquid stabilizer, usually about 1 part by weight per 100 parts of resin, provides the correct amount of divalent zinc.

As is well known, stabilizer response varies depending on the particular resins, plasticizers and other components of the resin compound. Effective heat stabilization is achieved within the indicated limits, but the amount of zinc required for optimum stabilization must obviously be determned for each system to be stabilized.

It will also be understood by those skilled in the art that many other known plastics additives may be usefully employed in conjunction with the present invention. These include, in addition to the epoxidized oils or other epoxy compounds previously mentioned, such commonly used additives as polyols, hindered phenols, and various antioxidants.

The following examples illustrate the invention:

EXAMPLE 1

General method for preparing and testing heat-stabilized resin compositions

The resin compositions described in the following examples and accompanying figures of the drawings were prepared according to the following general formula and procedure. All quantities are expressed in parts by weight per 100 parts of resin (abbreviated "phr.").

Resin (polyvinyl chloride): Phr.
   Plasticizer (dioctyl phthalate) _____ 50
   Lubricant (stearic acid) _____ 0.5
   Aryl alkyl phosphite _____ 1.0
   Zinc ($Zn^{++}$) as zinc neodecanoate _____ As noted The components were first mixed and blended by conventional means, then compounded for 8 minutes on a two-roll mill heated to 350° F., and finally stripped from the mill in the form of a sheet approximately 1/16 inch thick.

Discs having a diameter of 7/8 inch were punched from the sheet and subjected to further heating at a temperature of 380° F. To insure that all the discs were exposed to identical heat conditions they were placed on glass trays which in turn were supported and rotated by a ferris wheel-like device within a thermostatically controlled oven. At regular intervals (5 or 10 minutes) one tray was removed from the oven and examined for color.

The color of each test sample was rated on a scale of 0–5 as follows:

0=colorless
1=no more than a faint color
2=color no greater than a light tan
3=tan but no more than a light brown
4=brown, or with black edges but not completely black
5=completely black In the accompanying figures, a white square indicates a rating of 0–1, a lightly hatched square a rating of 2–3, and a heavily cross-hatched square a rating of 4–5.

EXAMPLE 2

Effect of increasing $Zn^{++}$ concentration on heat stability

Following the general procedure described in Example 1, a series of resin compositions was prepared in which the zinc content increased from 0 to 0.5 phr. The aryl alkyl phosphite was diphenyl decyl phosphite (dpdp). The heat stabilities of these compositions are shown graphically in FIG. 1.

The optimum effect under these conditions was achieved at zinc concentrations between about 0.0005 phr. and 0.0033 phr., but significant stabilization was achieved at zinc concentrations up to at least 0.005. At a zinc level of 0.0025 sudden degradation occurred after 15 minutes. For many applications this would not be a serious problem since the material remained essentially colorless for at least 15 minutes. At lower concentrations blackening was preceded by a period of gradual thermal discoloration. From these results, it is evident that increasing the concentration of zinc above about 0.0050 phr. serves only to shorten the time before sudden degradation occurs.

EXAMPLE 3

Effect of adding an epoxy compound

Figure 2:
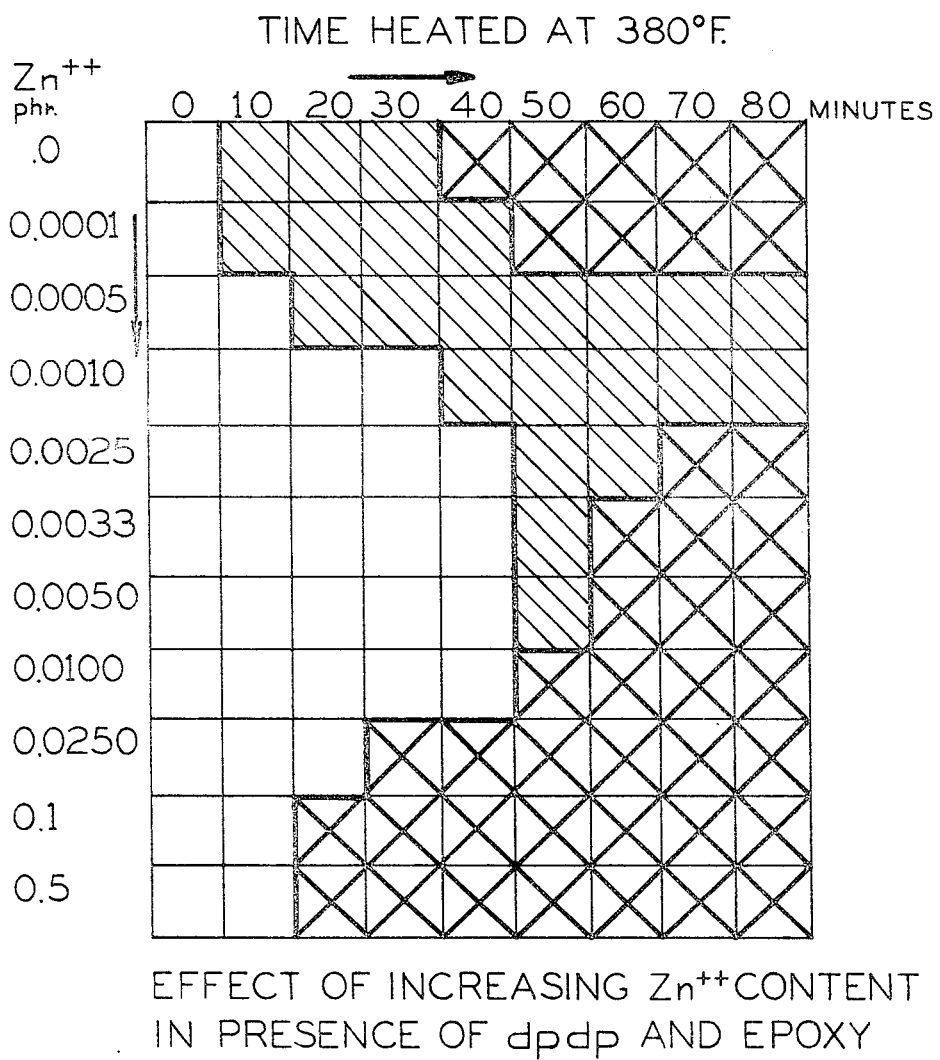

Another series of resin compositions was prepared similar to those of Example 2 except that the compounds contained 5 phr. of an epoxidized vegatable (soya) oil and the level of dioctyl phthalate was reduced from 50 to 45 phr. The results of these tests are shown graphically in FIG. 2.

It will be noted that the addition of the epoxidized oil not only extended the time during which the resin compound remained colorless but it also increased the amount of zinc which could be tolerated without sudden degradation. Under these conditions, sudden degradation did not occur until the zinc content exceeded 0.0050 phr. Increasing the zinc concentration above 0.0100 phr. resulted only in shortening the time before sudden degradation occurred. It is also to be noted that at zinc concentrations below about 0.0025 and above about 0.0001 phr. complete degradation did not occur within 80 minutes at 380° F.

Epoxidized vegetable oils are a particularly economical and convenient source of epoxy groups, but any epoxy compound known to be useful as a plastics additive will have an essentially similar effect.

EXAMPLE 4

Comparison of the effects of monoaryl and diaryl phosphites

Figure 3:
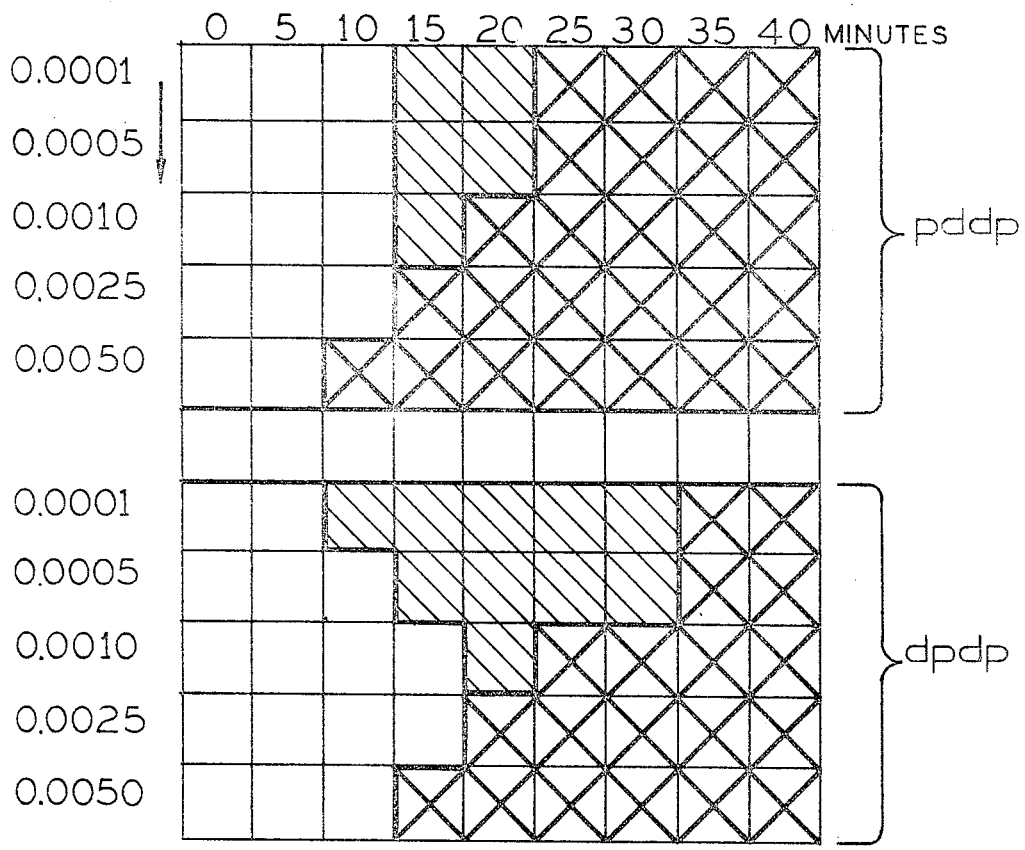

A series of resin compositions was prepared and tested, similar to those of Example 2 except that they contained phenyl didecyl phosphite (pddp) as the aryl alkyl phosphite. FIG. 3 shows the results of these tests compared with the results obtained using the same concentrations of diphenyl decyl phosphite (dpdp).

It will be noted that pddp was slightly less effective than dpdp in the absence of an epoxy compound, but this difference disappears if the resin compound also contains an epoxidized vegetable oil as described in Example 3.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

What is claimed is:

1. A heat-stabilized thermoplastic composition consisting of:
   (a) a vinyl chloride resin;
   (b) an aryl alkyl phosphite in an amount from about 0.5 to about 5 parts per 100 parts of resin;
   (c) a zinc salt, soluble in said phosphite, in an amount equivalent to from 0.0005 to 0.005 part of divalent zinc per 100 parts of resin;
the said thermoplastic composition being further characterized by its substantial freedom from metals which form colored sulfides.

2. A composition according to claim 1 in which the zinc salt is zinc neodecanoate.

3. A composition according to claim 1 in which the aryl alkyl phosphite is diphenyl decyl phosphite.

4. A composition according to claim 1 in which the aryl alkyl phosphite is phenyl didecyl phosphite.

5. A composition according to claim 1 which also contains an epoxy compound in an amount sufficient to extend the heat stability of the composition.

6. A composition according to claim 5 in which the epoxy compound is an epoxidized vegetable oil.

7. A heat-stabilized thermoplastic composition consisting of:
   (a) polyvinyl chloride;
   (b) an aryl alkyl phosphite in an amount from about 0.5 to about 5 parts per 100 parts of resin;
   (c) a zinc salt, soluble in said phosphite, in an amount equivalent to from 0.0005 to 0.005 part of divalent zinc per 100 parts of resin;
the said thermoplastic composition being further characterized by its substantial freedom from metals which form colored sulfides.

References Cited

UNITED STATES PATENTS

| | | | |
|---|---|---|---|
| 2,867,594 | 1/1959 | Hansen et al. | 260—23 |
| 2,953,537 | 9/1960 | McBrien | 260—23 |
| 3,382,199 | 5/1968 | Scullin | 260—23 |
| 3,449,292 | 6/1969 | Snedeker | 260—45.7 |

OTHER REFERENCES

Enjay: "Neo Acids" (1963) pp. 1, 7 (Technical Bulletin D–27).

Chevassus et al.: "The Stabilization of Polyvinyl Chloride" (1963) pp. 145 to 148.

DONALD E. CZAJA, Primary Examiner

D. J. BARRACK, Assistant Examiner

U.S. Cl. X.R.

260—31.8, 41, 45.7, 45.75, 45.85, 45.95